(12) United States Patent
Braley

(10) Patent No.: US 11,459,269 B2
(45) Date of Patent: Oct. 4, 2022

(54) GLAZING COMPRISING A STACK OF THIN LAYERS ACTING ON SOLAR RADIATION AND A BARRIER LAYER

(71) Applicant: SAINT-GOBAIN GLASS FRANCE, Courbevoie (FR)

(72) Inventor: Carole Braley, Choisy Au Bac (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/255,848

(22) PCT Filed: Jun. 27, 2019

(86) PCT No.: PCT/FR2019/051592
§ 371 (c)(1),
(2) Date: Dec. 23, 2020

(87) PCT Pub. No.: WO2020/002845
PCT Pub. Date: Jan. 2, 2020

(65) Prior Publication Data
US 2021/0261457 A1   Aug. 26, 2021

(30) Foreign Application Priority Data

Jun. 27, 2018   (FR) ...................................... 1855763

(51) Int. Cl.
*B32B 15/04* (2006.01)
*B32B 17/06* (2006.01)
*C03C 17/34* (2006.01)

(52) U.S. Cl.
CPC ...... *C03C 17/3435* (2013.01); *C03C 17/3417* (2013.01)

(58) Field of Classification Search
CPC ......................... C03C 17/3435; C03C 17/3417
USPC .......................................... 428/426, 428, 432
See application file for complete search history.

(56) References Cited

U.S. PATENT DOCUMENTS

| 6,875,319 B2 * | 4/2005 | Nadaud | C23C 14/024 |
| | | | 204/192.1 |
| 7,935,423 B2 * | 5/2011 | Belliot | C03C 17/3435 |
| | | | 428/432 |
| 2002/0034627 A1 * | 3/2002 | Jacquiod | C03C 17/009 |
| | | | 428/315.7 |
| 2007/0172647 A1 * | 7/2007 | Kleideiter | C03C 17/3435 |
| | | | 428/336 |
| 2007/0218264 A1 | 9/2007 | Gueneau et al. | |

(Continued)

FOREIGN PATENT DOCUMENTS

| WO | WO 02/24971 A1 | 3/2002 |
| WO | WO 2011/045412 A1 | 4/2011 |

OTHER PUBLICATIONS

"Substrate"https://www.lexico.com/en/definition/substrate, 2022.*
International Search Report as issued in International Patent Application No. PCT/FR2019/051592, dated Jan. 7, 2020.

*Primary Examiner* — Lauren R Colgan
(74) *Attorney, Agent, or Firm* — Pillsbury Winthrop Shaw Pittman LLP

(57) ABSTRACT

A transparent substrate, in particular made of glass, provided with a stack of thin layers acting on solar radiation, includes at least one functional layer, this functional layer being combined with at least one barrier underlayer, wherein this barrier underlayer is a layer of silicon dioxide having a thickness of between 15 and 25 nm.

18 Claims, 1 Drawing Sheet

(56) References Cited

U.S. PATENT DOCUMENTS

| | | | | |
|---|---|---|---|---|
| 2009/0301556 A1* | 12/2009 | Kawano | ............... | H01G 9/2072 |
| | | | | 136/256 |
| 2014/0338749 A1* | 11/2014 | Aguiar | ................ | B01J 37/0238 |
| | | | | 136/261 |
| 2017/0088460 A1* | 3/2017 | Maillet | ................ | E06B 3/6715 |
| 2017/0204001 A1* | 7/2017 | Maillet | ................ | G02B 5/286 |

* cited by examiner

GLAZING COMPRISING A STACK OF THIN LAYERS ACTING ON SOLAR RADIATION AND A BARRIER LAYER

CROSS-REFERENCE TO RELATED APPLICATIONS

This application is the U.S. National Stage of PCT/FR2019/051592, filed Jun. 27, 2019, which in turn claims priority to French patent application number 1855763 filed Jun. 27, 2018. The content of these applications are incorporated herein by reference in their entireties.

The invention relates to glazings provided with stacks of thin layers that act on solar radiation, in particular glazings intended for thermal insulation and/or solar protection.

This type of glazing is more particularly suitable for fitting into buildings: by virtue of the thin layers, it makes it possible, by varying the amount of solar radiation energy, to prevent the interior of rooms being excessively heated in the summer and thus helps to limit the consumption of energy needed for the air-conditioning thereof.

This action on the solar control is carried out by the use of a layer of titanium dioxide ($TiO_2$) having a thickness of around 20 to 30 nm. This layer of titanium dioxide advantageously makes it possible to reflect the incoming light.

However, it has been demonstrated that depositing the solar control layer directly on the transparent substrate that is the glass sheet is not optimal. Specifically, the titanium dioxide solar control layer adheres little to the transparent substrate so that it is easily degraded.

To solve this problem, an underlayer is advantageously arranged between the transparent substrate and the solar control layer to enable the solar control layer to adhere better.

This underlayer is chosen to have a barrier function. Specifically, during the heat treatment(s) that the substrate will undergo, a diffusion of alkali metals occurs and degrades the performance. This underlayer with a barrier function advantageously makes it possible to block this alkali-metal diffusion. This underlayer with a barrier function is for example a layer of silicon nitride ($Si_3N_4$) having a thickness of 30 to 40 nm.

It is known to carry out a subsequent enameling treatment, which affects very particularly the glazings used in the façade cladding panels also referred to as spandrel panels. Specifically, to opacify the glazings in spandrel panels, there are generally two possible routes: either a lacquer is deposited on the glass, that is dried and cured with a moderate heat treatment, or an enamel is deposited.

The enamel that is customarily deposited is composed of a powder containing a glass frit (the glassy matrix) and pigments used as colorants (the frit and the pigments being based on metal oxides), and a medium also referred to as a carrier enabling the application of the powder on the glass and the adhesion thereof with this glass at the time of the deposition. To obtain the final enameled coating, it is then necessary to fire it.

However, it has been observed that the enameling process with a dark enamel of the $TiO_2$ layer protected from the alkali metals with a barrier layer leads to the crystallization of the $TiO_2$ which generates stresses in the layer and leads to the appearance of a white halo.

SUMMARY OF THE INVENTION

The objective of the invention is in that case to resolve the problem of the prior art by proposing a glazing, the stack of which is improved to enable the adhesion of the solar control functional layer while limiting the crystallization thereof.

The invention firstly relates to a transparent substrate, in particular made of glass, provided with a stack of thin layers acting on solar radiation, said stack comprising at least one functional layer, this functional layer being combined with at least one barrier underlayer, characterized in that this barrier underlayer is a layer of silicon dioxide having a thickness of between 15 and 25 nm.

According to one example, said barrier underlayer of silicon dioxide has a thickness of 20 nm.

According to one example, an overlayer of silicon nitride having a slight mirror effect is arranged on the functional layer.

According to one example, said overlayer of silicon nitride having a slight mirror effect has a thickness of between 20 and 30 nm, preferably equal to 25 nm.

According to one example, an overlayer of silicon dioxide for chemical protection is arranged on the functional layer.

According to one example, said overlayer of silicon dioxide having a chemical protection effect has a thickness between 5 and 15 nm, preferably equal to 10 nm.

According to one example, an overlayer of titanium dioxide enabling mechanical protection is arranged on the functional layer.

According to one example, said overlayer of titanium dioxide has a thickness of between 1 and 5 nm, preferably equal to 2 nm.

According to one example, the functional layer is a layer of titanium dioxide $TiO_2$ having a thickness of between 20 and 30 nm, preferentially 24 nm.

The invention further relates to a facade cladding panel of spandrel type incorporating the substrate according to the invention.

The invention further relates to a building facade comprising a plurality of cladding panels according to the invention.

The invention further relates to an oven door comprising the substrate according to the invention.

The invention further relates to any object using the substrate according to the invention.

DESCRIPTION OF THE FIGURES

Other distinctive features and advantages will become clearly apparent from the nonlimiting description that is given thereof below, by way of indication, with reference to the appended drawings, in which.

DETAILED DESCRIPTION

Figure 1:
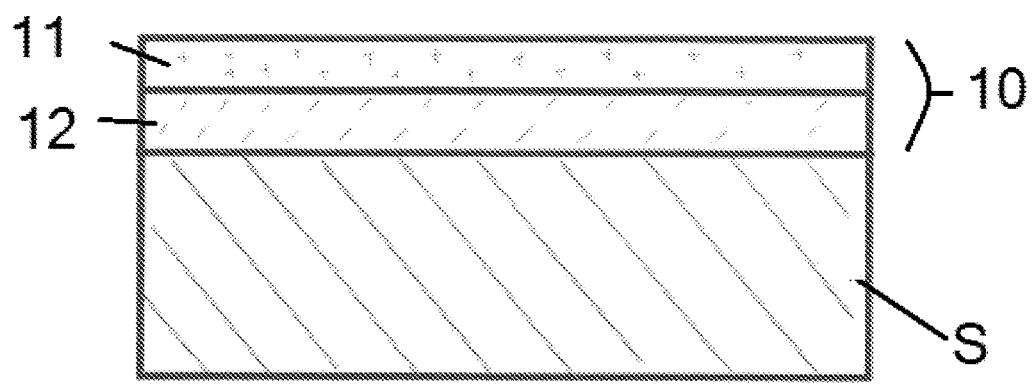
FIG. 1 is a schematic representation of the coated substrate according to the invention.

The present invention relates to a substrate S on which a coating 10 is deposited as seen in FIG. 1. The substrate S is a glass substrate of soda-lime type. This coating 10 may comprise several layers. These layers are used to obtain a function. One example of a function is solar control. Such a function consists in having a layer which protects from solar radiation. In the case of solar control, this function is provided by a functional layer 11 of titanium dioxide $TiO_2$ having a thickness of between 20 and 30 nm, preferentially 24 nm. This $TiO_2$ layer makes it possible to obtain a reflection of the light of between 25% and 35%, preferably 30%.

An enamel may be deposited on this functional layer. This enamel is composed of a powder containing a glass frit (the glassy matrix) and pigments used as colorants (the frit and the pigments being based on metal oxides), and a medium also referred to as a carrier enabling the application of the powder on the glass and the adhesion thereof with this glass at the time of the deposition. To obtain the final enameled coating, a firing step is carried out.

According to the invention, a barrier layer 12 is arranged between the glass substrate S and the functional layer 11 of titanium dioxide. This barrier layer is used to prevent the diffusion of alkali metals, in particular sodium, from the glass substrate. Specifically, during a heat treatment (necessary for the enameling in particular), sodium Na from the glass substrate may migrate toward the deposited layer.

Cleverly, this barrier layer 12 is a layer arranged in order to have a lower performance than the barrier layers customarily used and to enable a slight diffusion of the sodium into the functional layer.

This barrier layer 12 is a layer of silicon oxide $SiO_2$. This layer of silicon oxide $SiO_2$ has a thickness of between 15 and 25 nm, with a preferred value of 20 nm.

This practice is advantageous in that it consists of a known layer, the performance of which with respect to the diffusion of alkali metals, in particular sodium, from the glass substrate is deliberately degraded. This performance is degraded by a thinner thickness.

This degradation of the performance, not desired for a standard barrier layer, enables a diffusion of the alkali metals. The diffusion of alkali metals into the functional layer leads to a degradation of the performance of said layer but prevents the crystallization of the functional layer during the enameling. The barrier layer according to the invention enables a diffusion of the alkali metals that is restrained/limited so as not to degrade the performance of the functional layer, while enabling a diffusion of the alkali metals that is sufficient to prevent the crystallization of the functional layer.

In one variant, the barrier layer 12 is deposited under high pressure. This high pressure adversely affects the properties of the layer deposited so that it becomes more porous. Consequently, the diffusion of the alkali metals is facilitated.

Figure 2:
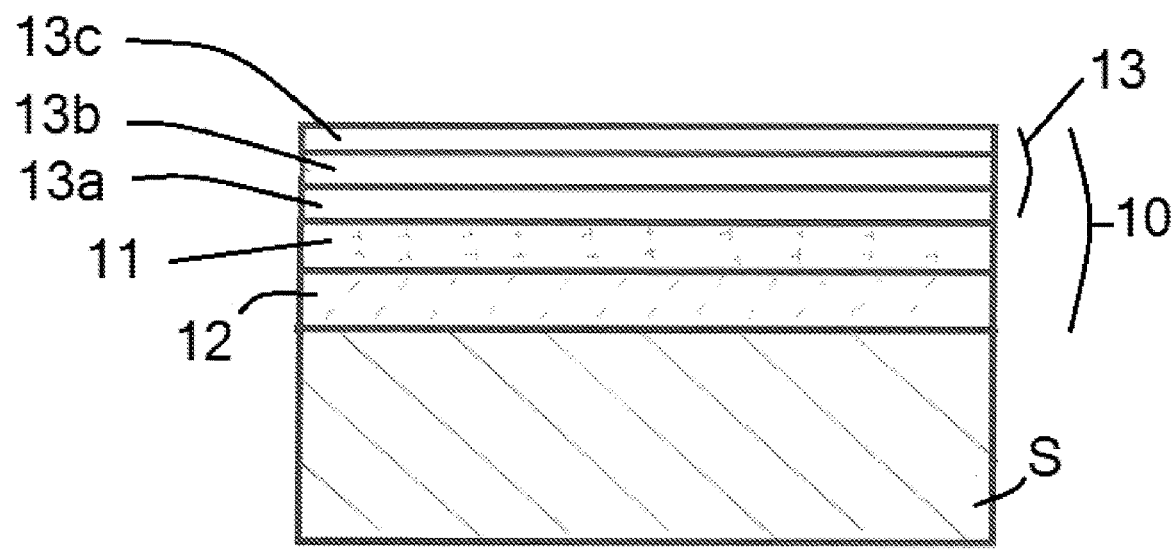
FIG. 2 is a schematic representation of a variant of the coated substrate according to the invention.

In a second variant seen in FIG. 2, the substrate comprises at least one overlayer 13 deposited on the functional layer. This overlayer based on silicon nitride or on silicon oxide (abbreviated to $Si_3N_4$ and $SiO_2$) or on silicon oxygen (abbreviated to SiON, without prejudicing the respective amounts of Si, O and N) has also proved to be highly advantageous on several counts: this type of material proves to be capable of protecting the layers of the stack of the invention at high temperature, in particular with respect to oxidation, by maintaining their integrity, which has made the stack according to the invention bendable/toughenable when the substrate bearing the stack is made of glass and when it is desired to subject it to such a heat treatment after deposition of the layers: the change in optical properties caused by a heat treatment of the toughening type is slight, with a light transmission and an external appearance in reflection that are modified sufficiently slightly so as not to be significantly perceptible to the human eye.

This overlayer 13 may be composed of a multitude of layers deposited on one another. One configuration consists in having a first layer 13a of silicon nitride $Si_3N_4$, the thickness of which is between 20 and 30 nm, preferably equal to 25 nm. This layer participates in the mirror effect.

Deposited on this silicon nitride layer is a silicon oxide layer 13b. This silicon oxide layer has a thickness of between 5 and 15 nm, preferably equal to 10 nm. This silicon oxide layer is a layer providing chemical protection, in particular against acids.

On top of this silicon oxide layer, a layer 13c of titanium oxide $TiO_2$ is deposited. This layer has a thickness of between 1 and 5 nm, preferably equal to 2 nm. This oxide layer makes it possible to provide mechanical protection.

Of course, these layers 13a, 13b and 13c may be deposited independently of one another.

The substrate S according to the invention may be used in various applications. A first application consists in using the substrate for the production of a glass panel, for example of spandrel type, for a facade. A second application consists in using the substrate for the production of an oven door.

Of course, the substrate will be used in all the applications for which it is necessary to apply a black enamel on the stack deposited on the substrate.

Of course, the present invention is not limited to the example illustrated, but can be varied and modified in various ways that will be apparent to a person skilled in the art.

The invention claimed is:

1. A transparent glass substrate, provided with a stack of layers acting on solar radiation, said stack comprising at least one functional layer of titanium dioxide $TiO_2$, said functional layer being combined with a barrier underlayer against diffusion of alkali metals from the transparent glass substrate to the functional layer and an overlayer, wherein the barrier underlayer is in contact with the transparent glass substrate and with the functional layer, the overlayer is arranged on the functional layer, and wherein the barrier underlayer is a layer of silicon dioxide having a thickness of between 15 and 25 nm and the overlayer is a layer of silicon nitride.

2. The transparent glass substrate as claimed in claim 1, wherein said barrier underlayer of silicon dioxide has a thickness of 20 nm.

3. The transparent glass substrate as claimed in claim 1, wherein said overlayer of silicon nitride contributing to a mirror effect.

4. The transparent glass substrate as claimed in claim 3, wherein said overlayer of silicon nitride has a thickness of between 20 and 30 nm.

5. The transparent glass substrate as claimed in claim 4, wherein said overlayer of silicon nitride has a thickness equal to 25 nm.

6. The transparent glass substrate as claimed in claim 1, wherein an overlayer of silicon dioxide for chemical protection is arranged on the functional layer.

7. The transparent glass substrate as claimed in claim 6, wherein said overlayer of silicon dioxide has a thickness between 5 and 15 nm.

8. The transparent glass substrate as claimed in claim 7, wherein said overlayer of silicon dioxide has a thickness equal to 10 nm.

9. The transparent glass substrate as claimed in claim 1, wherein an overlayer of titanium dioxide having a mechanical protection effect is arranged on the functional layer.

10. The transparent glass substrate as claimed in claim 9, wherein said overlayer of titanium dioxide has a thickness of between 1 and 5 nm.

11. The transparent glass substrate as claimed in claim 10, wherein said overlayer of titanium dioxide has a thickness equal to 2 nm.

12. The transparent glass substrate as claimed in claim 1, wherein the functional layer is of titanium dioxide $TiO_2$ having a thickness of between 20 and 30 nm.

13. The transparent glass substrate as claimed in claim 12, wherein the layer of titanium dioxide $TiO_2$ has a thickness of 24 nm.

14. The transparent glass substrate as claimed in claim 1, wherein the transparent substrate is a glass substrate.

15. The transparent glass substrate as claimed in claim 1, wherein the barrier underlayer is a single barrier underlayer of silicon oxide that has a thickness of between 15 and 20 nm.

16. A facade cladding spandrel panel incorporating the transparent glass substrate as claimed in claim 1.

17. A building facade comprising a plurality of cladding panels as claimed in claim 16.

18. An oven door comprising the transparent glass substrate as claimed in claim 1.

* * * * *